March 22, 1966  E. W. BRIDGE, JR  3,241,178
MEAT PATTY FORMING MACHINE
Filed Aug. 24, 1964  5 Sheets-Sheet 1

INVENTOR.
EDWARD W. BRIDGE, JR.
BY
ATTORNEY

March 22, 1966 E. W. BRIDGE, JR 3,241,178
MEAT PATTY FORMING MACHINE
Filed Aug. 24, 1964 5 Sheets-Sheet 2

INVENTOR.
EDWARD W. BRIDGE, JR.

BY
ATTORNEY

INVENTOR
EDWARD W. BRIDGE, JR.

BY

ATTORNEY

March 22, 1966  E. W. BRIDGE, JR  3,241,178
MEAT PATTY FORMING MACHINE
Filed Aug. 24, 1964  5 Sheets-Sheet 4
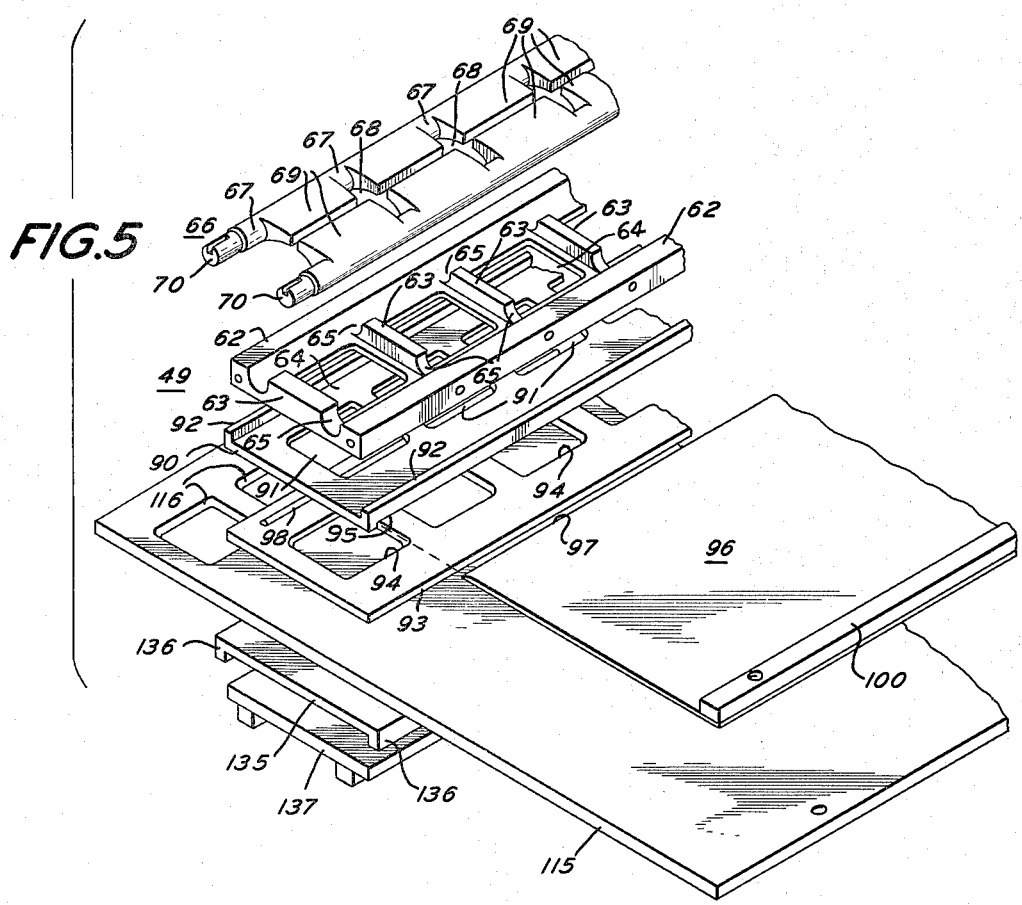
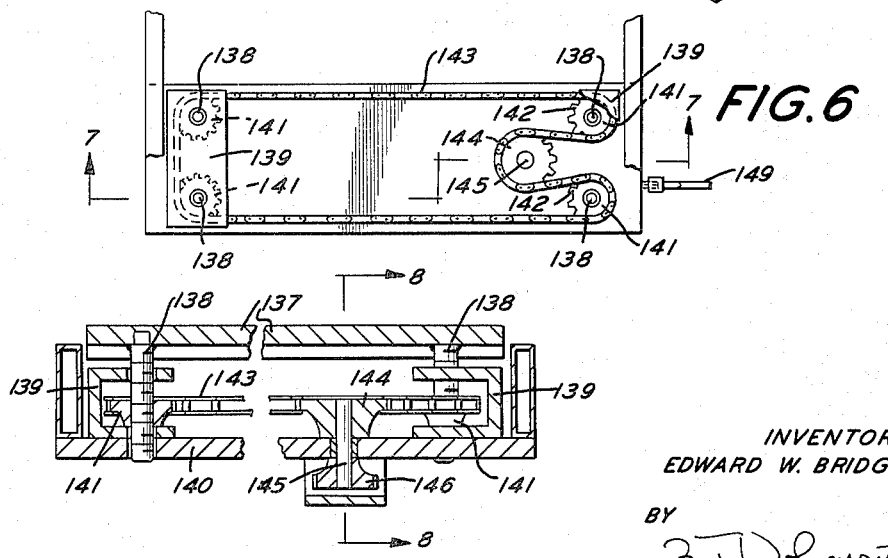
INVENTOR
EDWARD W. BRIDGE, JR.
BY
ATTORNEY March 22, 1966 E. W. BRIDGE, JR 3,241,178
MEAT PATTY FORMING MACHINE
Filed Aug. 24, 1964 5 Sheets-Sheet 5

INVENTOR
EDWARD W. BRIDGE, JR.

BY

ATTORNEY

United States Patent Office 3,241,178
Patented Mar. 22, 1966

3,241,178
MEAT PATTY FORMING MACHINE
Edward W. Bridge, Jr., Moorestown, N.J. (% Bridge Machine Co. Inc., 510 W. Broad St., Palmyra, N.J.)
Filed Aug. 24, 1964, Ser. No. 391,657
7 Claims. (Cl. 17—32)

This invention relates to machines for forming ground meat into cakes or patties of uniform size and shape.

Various machines have heretofore been proposed for molding meat into patties or cakes of predetermined size for subsequent cooking, canning and the like but these have had various shortcomings.

Certain of the machines heretofore proposed were highly complex, could not be readily adjusted or modified to change to an output of meat cakes of different size, were not adapted for easy cleaning of the parts in contact with the meat, were lacking in strength and durability or had other shortcomings.

It is the principal object of the present invention to provide a meat patty making machine which is simple in construction for access for cleaning, which is sturdy and reliable in its operation, and which can be continuously operated for extended periods of time without supervision.

It is a further object of the present invention to provide a meat patty making machine having simple but effective provisions in a hopper for delivery of the meat therefrom with a constant consistency for the formation of meat patties.

It is a further object of the present invention to provide a meat patty making machine having simple but effective provisions for intermittent timed delivery of meat to a location for forming to a predetermined size and shape and cut off from the supply.

It is a further object of the present invention to provide a meat patty making machine having a slidably mounted forming plate to control the shape and size of the finished patty, which plate can be readily removed and replaced with another plate to give a different shape and/or thickness.

It is a further object of the present invention to provide a meat patty making machine in which an improved adjustable support is provided at the location at which the patties are formed.

It is a further object of the present invention, to provide a meat patty making machine having an improved cut-off of ground meat supplied to the forming plate.

It is a further object of the present invention to provide a meat patty making machine having a forming plate and timed positive patty ejection apparatus removing the patties from the plate.

It is a further object of the present invention to provide a meat patty making machine in which ground meat is continuously advanced toward the forming location, is intermittently moved into the forming location and cut-off, and the meat from the forming location is advanced to a location for positive patty removal, the former then being returned for subsequent patty formation, all in timed relation.

Other objects and advantageous features of the invention will be apparent from the description and claims.

The nature and characteristic features of the invention will be more readily understood from the following description taken in connection with the accompanying drawings forming part thereof, in which:

FIGURE 1 is a side elevational view of a meat patty making machine in accordance with the invention, parts being broken away to show the delivery conveyor belt;

FIG. 2 is a fragmentary elevational view of the opposite side of the hopper from that shown in FIG. 1;

FIG. 5 is a partial exploded perspective view of the feeding, cut-off, forming, and advancing structure in the machine of the present invention;

FIG. 6 is a fragmentary horizontal sectional view, enlarged, of the adjustable supporting mechanism;

FIG. 7 is a vertical sectional view taken approximately on the line 7—7 of FIG. 6;

Figure 3:
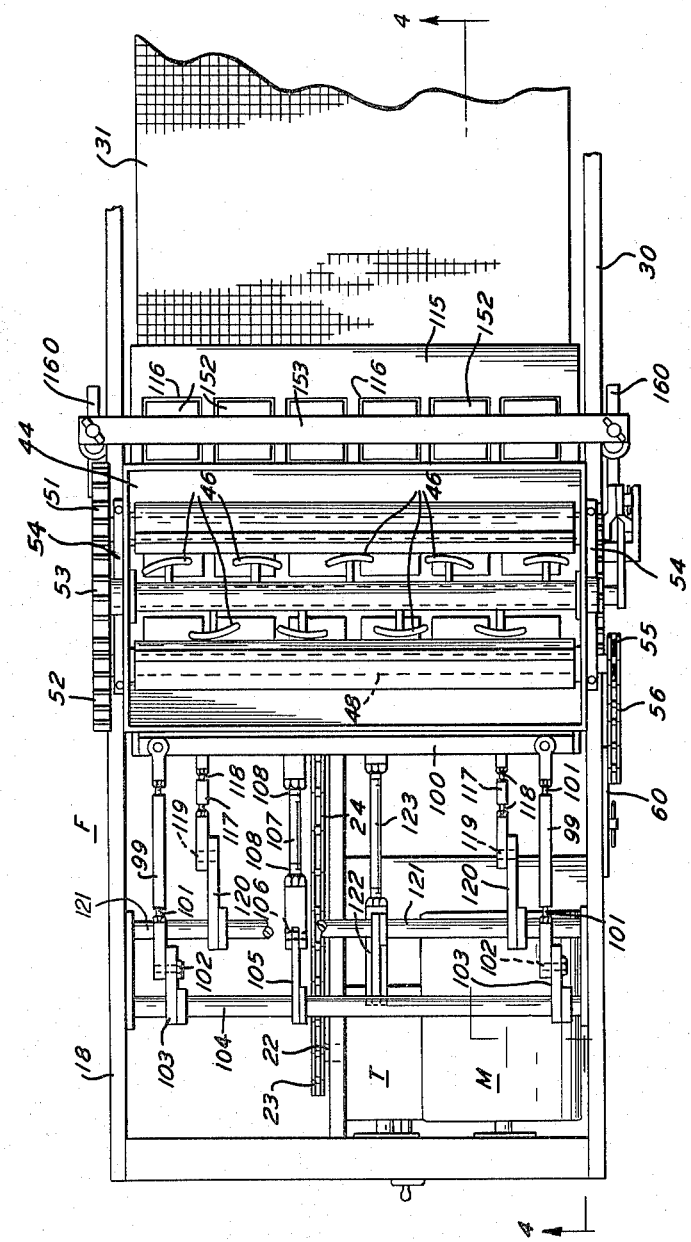
FIG. 3 is a top plan view of the machine shown in FIG. 1.

It should, of course, be understood that the description and drawings herein are illustrative merely, and that various modifications and changes can be made in the structure disclosed without departing from the spirit of the invention.

Like numerals refer to like parts throughout the several views.

The machine in accordance with the invention includes a hopper having a continuously operated ground meat feeding impeller for maintaining a supply of meat to intermittently operated pushers which positively advance the meat downwardly toward the forming location. At the forming location a former plate has a plurality of openings for receiving the meat, one for each patty with a spacer plate and cut-off plate thereabove. The former plate determines the size and shape of the patties. The former plate, after being charged, has the openings thereof advanced to an unloading location where the formed meat is positively ejected for removal by a continuously travelling delivery conveyor belt. The former plate is returned to its initial position for refilling in the next cycle.

An electric motor is provided which through driving mechanism operates the feeding impeller, the meat pushers, the former plate, the cut-off plate, and the ejectors in timed relation, and continuously operates the delivery conveyor belt.

Referring now more particularly to the drawings, the machine in accordance with the invention includes a frame F with supporting legs 15 having casters 17 at their lower ends for movement of the machine to the desired location in the plant for use.

The frame F has an upper horizontal frame section 18, an intermediate horizontal frame section 19 and a lower horizontal frame section 20.

The frame section 20 has secured thereto an electric motor M which is connected to a variable speed transmission T, also secured to the frame section 20.

The transmission T has an output shaft 22 with a sprocket 23 keyed thereto. The sprocket 23 has a chain 24 in engagement therewith which is also carried on a sprocket 25 keyed to a main drive shaft 26 carried on the frame section 19.

The frame F has an apron 30 carried thereby at the top of which an endless conveyor belt 31 is provided mounted at one end on an idler pulley 32 on a shaft 33 and mounted at the other end on a drive pulley 34 on a shaft 35 supported on the frame section 18. The shaft 35 has a sprocket 36 keyed thereto which is connected by a chain 37 to a sprocket 38 keyed to a shaft 39. The shaft 39 has a driven sprocket 40 secured thereto with a chain 41 engaged therewith and with a sprocket 42 secured to the shaft 26.

The upper frame section 18 has a hopper 44 carried thereby for the reception of the ground meat to be made into patties. The hopper 44 has a horizontal impeller shaft 45 extending from one side to the other side therein. The shaft 45 has a plurality of alternately oppositely disposed impeller arms 46 carried thereby for urging the meat downwardly in the hopper 44 along the center thereof. Within the hopper 44, oppositely rotating delivery elements 47 are provided secured to horizontal parallel shafts 48 to urge the ground meat toward a central location above and along a throat plate 49. The throat plate 49 is preferably made of stainless steel.

The delivery elements 47 include opposite longitudinal arms 50 and are rotated in timed relation by gears 51 and 52 keyed to the shafts 48 (see FIG. 2), a gear 53 engaged with the gear 51 being keyed to the shaft 45. The shafts 48 are carried on the hopper 44 in journal blocks 54 at their ends.

One of the shafts 48 (see FIG. 1) has a sprocket 55 keyed thereto with which a chain 56 is in engagement. The chain 56 also engages a sprocket 57 keyed to the shaft 26. The slack in the chain 56 can be adjusted by the positioning of an idler sprocket 58 on a shaft 59. The shaft 59 is adjustably mounted at a selected position along a slide 60.

The throat plate 49, as can be seen particularly in FIG. 5, has side rail portions 62 with connecting cross bars 63 providing throat openings 64. Journal notches 65 are provided at the ends of the cross bars 63. Oscillating feeders 66 are provided, preferably of stainless steel, having journal portions 67 at cut-outs 68 between pusher plates 69, which plates 69 move upwardly to separated positions to permit forced entry of ground meat therebetween and move downwardly in the throat openings 64 at least to horizontal positions for pushing the meat downwardly for forming.

Figure 4:
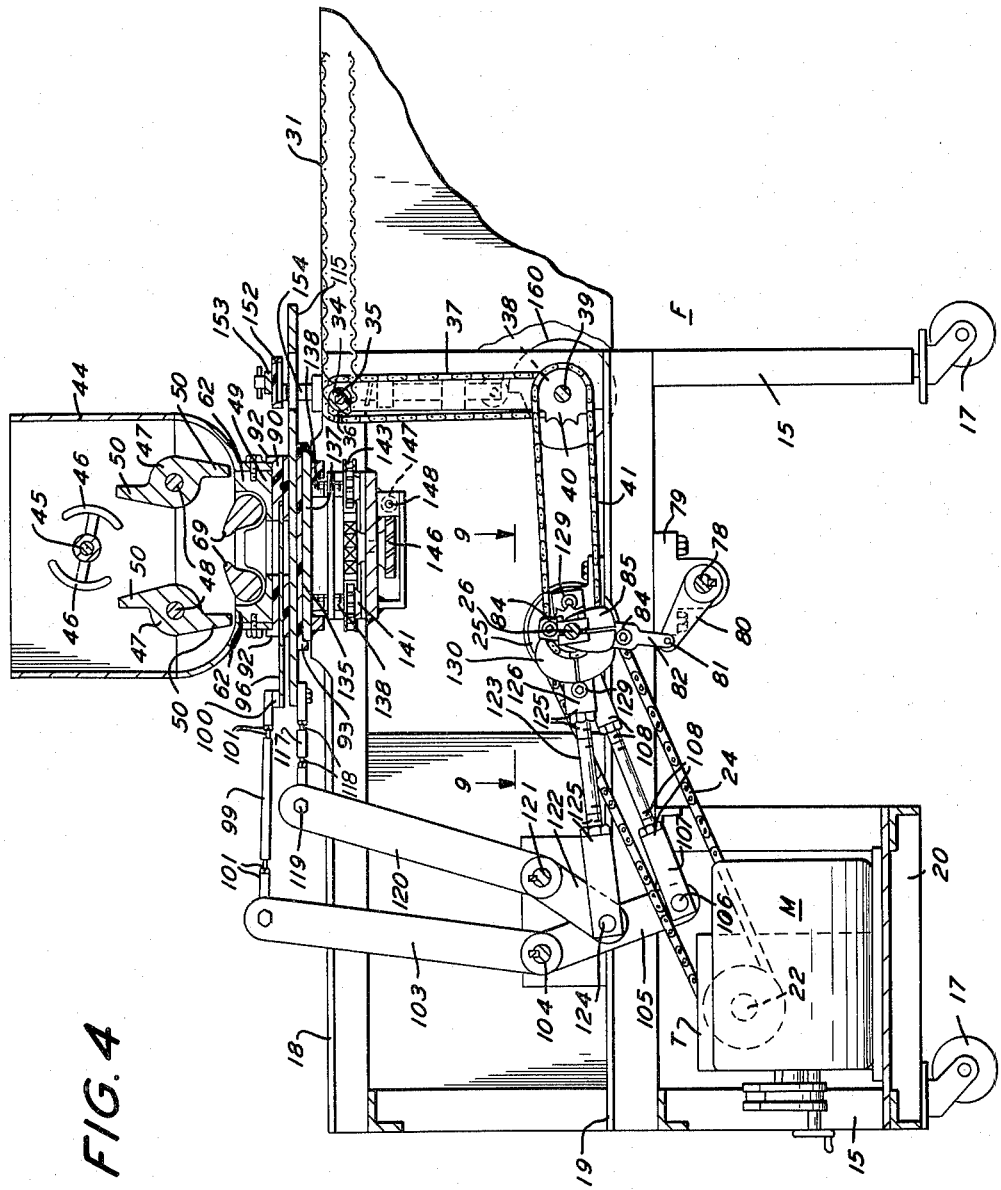
FIG. 4 is a vertical sectional view taken approximately on the line 4—4 of FIG. 3.
Figure 8:
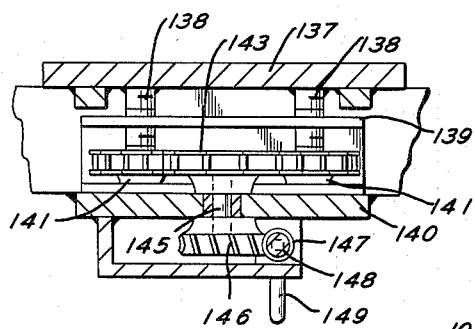
FIG. 8 is a vertical sectional view taken approximately on the line 8—8 of FIG. 7.
Figure 9:
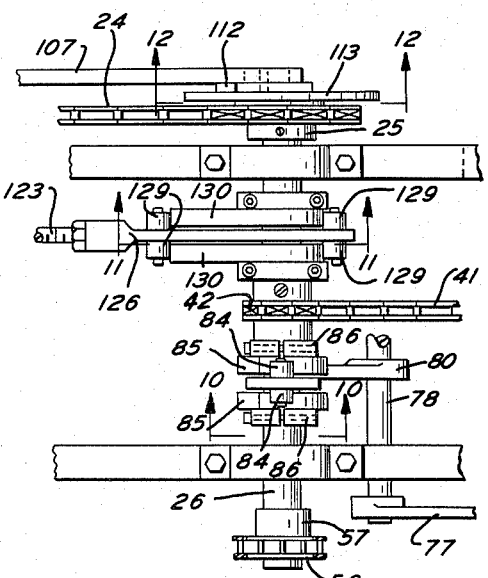
FIG. 9 is a fragmentary horizontal sectional view, enlarged, taken approximately on the line 9—9 of FIG. 4.
Figure 10:
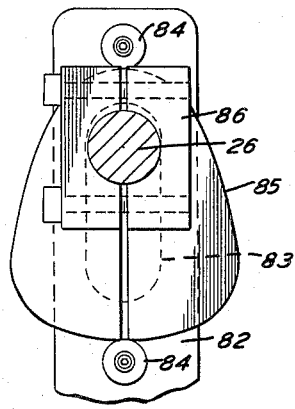
FIG. 10 is a vertical sectional view, further enlarged, taken approximately on the line 10—10 of FIG. 9.
Figure 11:
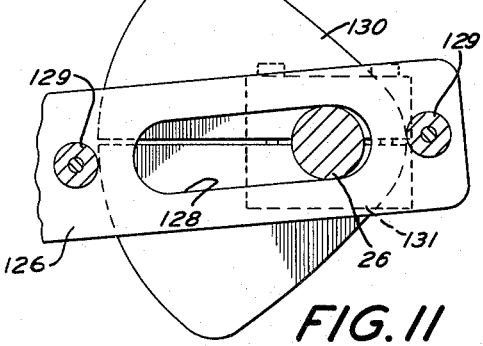
FIG. 11 is a vertical sectional view, further enlarged, taken approximately on the line 11—11 of FIG. 9.

The feeders 66 have ends 70 with interengaging gears 72 keyed thereto. One of the gears 72 has an actuating arm 73 secured thereto which is pivotally connected by a pivot pin 74 to an operating link 75. The link 75 is conected by a pivot pin 76 to a lever 77 which is keyed to a shaft 78. The shaft 78 is carried in journals 79 on the intermediate frame section 19. Position on shaft 78 in spaced relation to the lever 77 is a lever 80 keyed to the shaft 78 (see FIGS. 1 and 4). The lever 80 is pivotally connected by a pivot pin 81 to a cam follower link 82 which has a slot 83 (see FIG. 10) and opposite spaced pairs of cam follower rollers 84. The follower rollers 84 engage the edges of a pair of like plate cams 85 which are adjustably clamped at the desired angular position on the shaft 26 by clamps 86. The cams 85 with the slot 83 provide for rapid raising of the pusher plates 69 for entry of meat therebetween and slower downward movement for pressing the meat downwardly to form the patties therebelow.

The throat plate 49 has disposed immediately therebelow an upper guide plate 90 having openings 91 of the same size and shape as the throat openings 64, and side rims 92 for retaining it in position with respect to the throat plate 49.

The upper guide plate 90 can be made of a friction reducing yet inert material, such as nylon. The upper guide plate 90 has disposed therebelow a lower guide plate 93, preferably of the same material, with openings 94 of the same size and shape as the openings 64, a recess 95 being provided at the meeting faces of the plates 90 and 93 for access of a cut off plate 96 preferably of stainless steel.

The cut off plate 96 has a leading edge 97 to separate the meat thereabove from the meat therebelow when the edge is advanced across the openings 91 and 94. The guide plate 93 has a longitudinal seal 98 therealong to prevent the escape of meat under pressure at this location.

Figure 12:
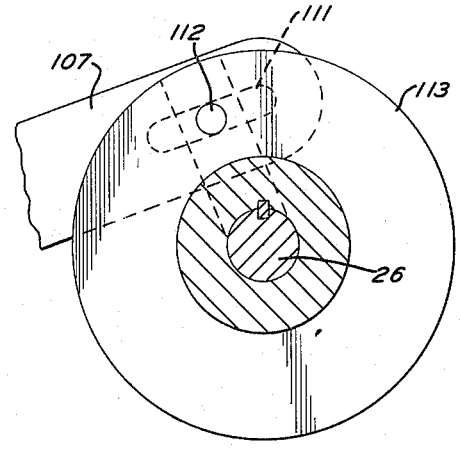
FIG. 12 is a vertical sectional view, further enlarged, taken approximately on the line 12—12 of FIG. 9.

The cut off plate 96 is positioned in the desired timed relation to the other operations by arms 99 which are connected to a plate bar 100 the bar 100 being secured to the cut-off plate 96. The arms 99 are preferably adjustable in length by oppositely threaded connections 101 at their ends and are pivotally connected by pivot pins 102 to actuating levers 103 which are keyed to a shaft 104 supported above the intermediate frame section 19. The shaft 104 also has keyed thereto a lever 105 which is pivotally connected by a pivot pin 106 to a link 107. The link 107 has interengaging threaded portions 108 for adjustment of its length. The link 107 (see FIG. 12) has an elongated slot 111 within which a pin 112 is in engagement. The pin 112 is carried on a crank plate 113 keyed to the shaft 26.

Immediately beneath the lower guide plate 93, a former plate 115 is provided, preferably of stainless steel, of the desired thickness in accordance with the desired thickness of the meat patties. The former plate 115 is provided with a pluarilty of forming openings 116 preferably of the same size and shape as the throat openings 64.

The former plate 115 during part of its cycle of operation has the openings 116 aligned beneath the throat openings 64 for the delivery of meat thereto, and after loading and during part of its cycle the openings 116 are moved to another position for discharge of the formed meat patties.

The former plate 115 is positioned in timed relation by actuating links 117, adjustable in length by interengaging threaded portions 118. The links 117 are connected by pivot pins 119 to levers 120 which are keyed to a shaft 121. The shaft 121 has a lever 122 keyed thereto which is pivotally connected by a pivot pin 124 to a link 123. The link 123 is adjustable in length by interengaging threaded portions 125.

The link 123 has an end extension 126 with an elongated slot 128 within which the shaft 26 extends and has opposite pairs of spaced cam follower rollers 129. The follower rollers 129 engage the edges of a pair of like plate cams 130 which are adjustably clamped at the desired angular position on the shaft 26 by clamps 131.

The former plate 115 can be supported in any desired manner but in order to provide a positive support under the loading which occurs as the meat is forced into the openings 94 while they are aligned with the throat opening 64, and to reduce friction and abrasion, an upper support plate 135 is provided, preferably of the same material as the plates 90 and 93. The plate 135 has rims 136 which extend downward on opposite sides of a table plate 137. The table 137 has four threaded posts 138 rigidly secured thereto and extending downwardly therefrom through a table frame 139 supported by a lower table frame plate 140. The frame plate 140 is carried by the upper frame section 18.

Each of the posts 138 has a nut 141 thereon with exterior teeth 142 for simultaneous engagement by an endless chain 143. The chain 143 has a sprocket 144 in engagement therewith secured to a shaft 145 which extends downwardly through the frame plate 140 and has a bevel gear 146 thereon beneath the frame plate 140. The gear 146 has a worm gear 147, carried by a shaft 148, in operating engagement therewith. The shaft 148 has a manually accessible operating handle 149 thereon for turning the shaft 148 and thereby, through the gear 147, shaft 148, sprocket 144, chain 143 and nuts 141 raising or lowering the table plate 137 and the support plate 135 thereon, to provide the desired support in engagement with the former plate 115.

The adjustability of the support of the former plate 115 permits of rapidly substituting a different former plate 115 having a different thickness to change the thickness of the meat patty.

In order to remove the patties from the openings 116 of the former plate 115 in a positive manner, ejector plates 152, shaped to enter the openings 116, are provided carried on an ejector bar 153. The bar 153, at each end, has downwardly extending energizing rods 154. The rods 154 are mounted for vertical movement in spaced upper and lower supports 155 and 156, carried by the frame F. The rods 154 have mounted thereon springs 157 engaging collars 158 which are secured by set screws 159, and the upper supports 155, the springs 157 normally urging the rods 154, the bar 153 and the plates 152 downwardly. Cams 160 keyed to the shaft 39 engage follower rollers 161 at the lower ends of the rods 154 to raise the rods 154 against the force exerted by the springs 157.

The cams 160 have cut out portions 162 to permit the rapid descent of the rods 154 for patty ejection, the return of the rods 154 to positions with the plates 152 clear of the plate 115 and the retention of the plates 152 clear of the plate 115 for movement of the plate 115 to its position for filling, during filling and during movement of the plate 115 to its position for patty ejection.

The mode of operation will now be pointed out.

Upon operation of the motor M, and the transmission T connected thereto, the chain 24 will be driven by the sprocket 23 and will effect continuous rotation of the main shaft 26.

Rotation of the shaft 26 through the sprocket 57, chain 56, and sprocket 55, effects driving of one of the shafts 48 and this will in turn, through the gears 51 and 53 and shaft 45, cause the rotation of the impeller arms 46 to force ground meat downwardly in the hopper 44 for further downward delivery by the rotation of the delivery elements 47. These elements 47 are rotated continuously with the impeller arms 46 by their interconnection through the gears 51 and 52 and the engagement of the gear 53 with the gear 51.

Rotation of the shaft 26 is also effective through the operation of the cams 130, their followers 129, and the linkage which includes the extension 126, to position the plate 115 in timed relation to the operation of the pusher plates 69 and the cut off plate 96 for filling of the former openings 116, cut off of the column of downwardly urged ground meat by the movement of the cut off plate 96, and movement of the former plate 115 to position the former openings 116 at locations for ejection of the meat patties by the ejector plates 152 onto the conveyor belt 31 for use.

Rotation of the shaft 26 is effective through the operation of the cams 85 and the linkage operated thereby, including the follower link 82, the lever 80, shaft 78, lever 77, link 75 and gears 72 on the extensions 70, for meat feeding.

Rotation of the shaft 26 is also effective through the operation of the crank pin 112 and the linkage operated thereby to position the cut off plate 96 to clear the openings 91 and 94 to permit the delivery of ground meat downwardly or to cut off communication with the former plate 115.

Rotation of the shaft 26 is effective for rotating the shaft 39 which provides, through the cam 160 and the linkage connected thereto, for ejection of meat patties from the openings 116 in timed relation and which further provides through the chain 37 for driving of the conveyor belt 31 to remove the formed and ejected meat patties for use.

If desired, a former plate 115 of different thickness can be easily inserted, with the support lowered to permit the change, or a new assembly of throat plate 49, feeders 66, upper and lower guide plates 90 and 93, and former plate 115 to provide different sizes or shapes of patties can be easily substituted.

It will thus been seen that apparatus has been provided for effectively carrying out the objects of the invention.

I claim:

1. A meat patty forming machine comprising
   a frame,
   a drive shaft carried by said frame,
   a hopper carried by said frame for the reception of a supply of ground meat,
   first members in said hopper for continuously forcing ground meat in a predetermined direction,
   driving connections from said shaft to said first members,
   a throat plate fixedly mounted in said frame having a plurality of openings for the passage of meat,
   second members in said hopper for intermittently delivering ground meat from said forcing members through said openings in said throat plate,
   driving connections from said shaft to said second members,
   a former plate having a plurality of openings for selective alignment with said throat openings and for movement from such alignment to positions for removal of patties in said former plate openings,
   said plate being of predetermined thickness to determine the thickness of the patties to be formed,
   adjustable supporting means for said former plate,
   members connected to said drive shaft for controlling the positioning of said former plate with respect to said throat plate openings in predetermined timed relation, and
   a movable cut off member between said throat plate and said former plate movable in predetermined timed relation with respect to said throat plate openings for cutting off delivery of meat under pressure from said throat plate openings to said frame plate openings, and
   driving connections from said drive shaft to said cut off member.

2. A meat patty forming machine as defined in claim 1 in which
   said driving connections from said drive shaft to said movable cut off member include an intermittent timed driving member for actuating said movable cut off member.

3. A meat patty forming machine as defined in claim 1 in which
   said driving connections from said drive shaft to said second members include an intermittent timed driving member for actuating said second members in said hopper for intermittently delivering ground meat.

4. A meat patty forming machine as defined in claim 1 in which
   said drive shaft has cam members thereon, and said position controlling members for said former plate include said cam members.

5. A meat patty forming machine as defined in claim 1 in which
   said throat plate has journal portions, and
   said members for intermittently delivering ground meat are oscillatably supported in said throat plate.

6. A meat patty forming machine as defined in claim 5 in which
   said members for intermittently delivering ground meat have pusher plate portions movable into the throat plate openings.

7. A meat patty forming machine as defined in claim 1 in which intermittingly operated members are provided for ejecting meat patties from said former plate openings with said former plate positioned for patty removal.

References Cited by the Examiner

UNITED STATES PATENTS

| | | | |
|---|---|---|---|
| 2,475,463 | 7/1949 | Santo | 17—32 |
| 2,530,062 | 11/1950 | Holly | 17—32 |
| 3,061,872 | 11/1962 | Holly | 17—32 |

FOREIGN PATENTS 961,532 6/1964 Great Britain.

SAMUEL KOREN, *Primary Examiner.*

LUCIE H. LAUDENSLAGER, *Examiner.*